US011200071B2

(12) United States Patent
Shao et al.

(10) Patent No.: US 11,200,071 B2
(45) Date of Patent: Dec. 14, 2021

(54) COGNITIVE SCROLLBAR

(71) Applicant: International Business Machines Corporation, Armonk, NY (US)

(72) Inventors: Feng Shao, Shanghai (CN); Wei Ping Tu, Shanghai (CN); Jin Yin, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 15/443,220

(22) Filed: Feb. 27, 2017

(65) Prior Publication Data
US 2018/0246733 A1    Aug. 30, 2018

(51) Int. Cl.
*G06F 9/451*     (2018.01)
*G06F 3/0485*    (2013.01)
*G06F 40/106*    (2020.01)

(52) U.S. Cl.
CPC .......... *G06F 9/451* (2018.02); *G06F 3/04855* (2013.01); *G06F 40/106* (2020.01)

(58) Field of Classification Search
CPC ..... G06F 9/451; G06F 3/04855; G06F 17/212
USPC .......................................... 715/205, 786, 255
See application file for complete search history.

(56) References Cited

U.S. PATENT DOCUMENTS

| | | | | |
|---|---|---|---|---|
| 6,697,825 B1 * | 2/2004 | Underwood | ............ | G06F 17/21 |
| | | | | 707/E17.116 |
| 7,395,500 B2 * | 7/2008 | Whittle | ................. | G06F 3/0481 |
| | | | | 707/E17.121 |
| 7,409,635 B2 | 8/2008 | Epstein | | |
| 7,502,867 B2 | 3/2009 | Mitchell et al. | | |
| 8,443,277 B2 * | 5/2013 | Goldman | ............ | G06F 17/2235 |
| | | | | 715/205 |
| 8,607,156 B1 | 12/2013 | Jania et al. | | |
| 8,713,471 B1 * | 4/2014 | Rowley | ................. | G06F 3/0485 |
| | | | | 715/784 |
| 2004/0216056 A1 * | 10/2004 | Tootill | ................ | G06F 3/04855 |
| | | | | 715/786 |
| 2005/0050301 A1 | 3/2005 | Whittle et al. | | |

(Continued)

OTHER PUBLICATIONS

Nebeling et al., Metrics for the Evaluation of News Site Content Layout, in Large Screen Contexts, ACM 2011, pp. 1511-1520. (Year: 2011).*

(Continued)

*Primary Examiner* — William D Titcomb
(74) *Attorney, Agent, or Firm* — William H. Hartwell

(57) ABSTRACT

A method includes determining dimensions of a web browser presenting a webpage, the webpage including an inner container and an outer container. The method modifies dimensions of the outer container of the webpage based upon an associated maximum height value, an associated minimum height value, and an amount of data within the outer container. Responsive to calculating a vertical height of the inner container, assigning a maximum height value and a minimum height value to the inner container. The method modifies dimensions of the inner container to a minimum height for the web browser to present the data of the webpage, based on the assigned maximum height value and minimum height value of the inner container. The method augments the web browser to include a scrollbar based on the modified dimensions of the outer container and the modified dimensions of the inner container.

15 Claims, 6 Drawing Sheets

(56) References Cited

U.S. PATENT DOCUMENTS

| | | | |
|---|---|---|---|
| 2005/0050462 A1* | 3/2005 | Whittle | G06F 3/0481 715/247 |
| 2006/0085741 A1 | 4/2006 | Weiner et al. | |
| 2006/0107204 A1 | 5/2006 | Epstein | |
| 2007/0168855 A1* | 7/2007 | Patel | G06F 3/048 715/205 |
| 2008/0189647 A1 | 8/2008 | Tapuska | |
| 2009/0228779 A1 | 9/2009 | Williamson et al. | |
| 2010/0180186 A1* | 7/2010 | Skinner | G06F 21/10 715/205 |
| 2012/0110443 A1* | 5/2012 | Lemonik | G06F 17/2288 715/255 |
| 2012/0284596 A1 | 11/2012 | Bushnell et al. | |
| 2013/0167012 A1 | 6/2013 | Fischer | |
| 2014/0081789 A1* | 3/2014 | Rollins | G06Q 20/02 705/26.1 |
| 2014/0201677 A1 | 7/2014 | Jin | |
| 2016/0140093 A1 | 5/2016 | Block et al. | |
| 2016/0170629 A1* | 6/2016 | Gabryjelski | G06F 3/04842 715/786 |
| 2017/0097740 A1* | 4/2017 | Kimber | H04L 67/02 |
| 2017/0337166 A1* | 11/2017 | Falkenberg | G06F 17/2247 |

OTHER PUBLICATIONS

Card et al., The WebBook and the Web Forager: An Information Workspace for the World-Wide Web, ACM 1996, pp. 111-117. (Year: 1996).*

List of IBM Patents or Patent Applications Treated as Related, Appendix P, Filed Herewith, 2 pages.

Shao, et al., "Cognitive Scrollbar", U.S. Appl. No. 15/845,226, filed Dec. 18, 2017, (a copy is not provided as this application is available to the Examiner).

Blum, et al., "IBM DS8880 Architecture and Implementation" (Release 8.2.1) Redbooks, International Technical Support Organization, Jan. 2017, Copyright IBM Corp. 2016, 2017, 472 pages.

Paterson et al., "Using the XML-based Clinical Document Architecture for Exchange of Structured Discharge Summaries", Proceedings of the 35th Hawaii International Conference on System Sciences, IEEE 2002, 10 pages.

* cited by examiner

COGNITIVE SCROLLBAR

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application:

(i) BLUM, et al., "IBM DS8880 Architecture and Implementation" (Release 8.2.1) Redbooks, International Technical Support Organization, January 2017, Copyright IBM Corp. 2016, 2017, 472 pages.

BACKGROUND

The present invention relates generally to the field of computing, and more particularly to interacting with data objects in the client area of a graphical user interface.

A scroll bar permits a user to move a data object in the client area of a user interface of an application. Because the window can display a data object, such as a document or a bitmap, that is larger than the window's client area, a scroll bar permits the user to bring into view the portions of the object that extend beyond the borders of the client. Scroll bars are often included in any window for which the content of the client area extends beyond the window's borders. A scroll bar's orientation determines the direction in which scrolling occurs when the user operates the scroll bar. A horizontal scroll bar enables the user to move the content of the window to the left or right, while a vertical scroll bar enables the user to scroll the content up or down.

Scroll bars are presented in containers. A container is a part of a web server that interacts with a servlet. A container is responsible for managing the lifecycle of servlets, mapping a URL to a particular servlet, and ensuring that the URL requester has the correct address rights. A container handles requests to servlets and other type files including server-side code. The container creates servlet instances, loads and unloads servlets, creates and manages request and response objects, and performs other servlet management tasks.

SUMMARY

Embodiments of the present invention include a method, computer program product and computer system for calculating space on a web browser for a scrollbar. A computer-implemented method includes determining, by one or more processors, dimensions of a web browser presenting a webpage, the webpage including an inner container and an outer container; modifying, by one or more processors, dimensions of the outer container of the webpage based upon an associated maximum height value, an associated minimum height value, and an amount of data within the outer container; responsive to calculating a vertical height of the inner container, assigning, by one or more processors, a maximum height value and a minimum height value to the inner container; modifying, by one or more processors, dimensions of the inner container to a minimum height for the web browser to present the data of the webpage, based on the assigned maximum height value and minimum height value of the inner container; and augmenting, by one or more processors, the web browser to include a scrollbar based on the modified dimensions of the outer container and the modified dimensions of the inner container.

DETAILED DESCRIPTION

Figure 1:
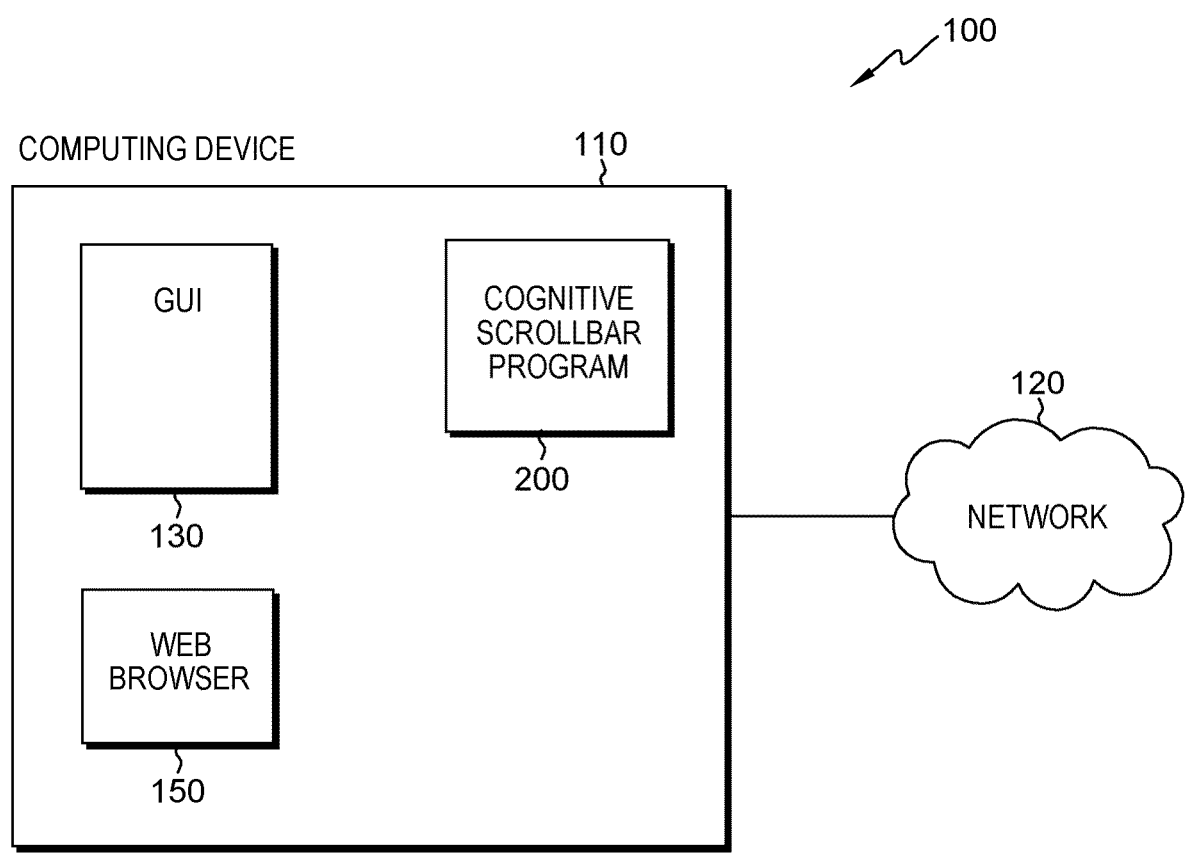
FIG. 1 is a functional block diagram illustrating a distributed data processing environment, in accordance with an embodiment of the present invention.

Example embodiments, in accordance with the present invention, will now be described in detail with reference to the Figures. FIG. 1 is a functional block diagram, general designated 100, illustrating a distributed data processing environment. Distributed data processing environment 100 includes computing device 110, interconnected with network 120.

Computing device 110 may be a desktop computer, a laptop computer, a tablet computer, a specialized computer server, a smartphone, a wearable device (e.g., smart watch, personal fitness device, personal safety device), or any programmable computer system known in the art with an interactive display or any other computer system known in the art. In certain embodiments, computing device 110 represents a computer system utilizing clustered computers and components that act as a single pool of seamless resources when accessed through network 120, as is common in data centers and with cloud computing applications. In general, computing device 110 is representative of any programmable electronic device or combination of programmable electronic devices capable of executing machine-readable program instructions and communicating with other computer devices via a network. In one embodiment, computing device 110 includes graphical user interface (GUI) 130, cognitive scrollbar program 200, web browser 150, and any other electronic devices not illustrated in FIG. 1, via network 120. In another embodiment, cognitive scrollbar program 200 can be remotely hosted to another computing device accessible by network 120. The various programs on computing device 110 include a web browser, an electronic mail client, security software (e.g., a firewall program, a geo-locating program, an encryption program, etc.), an instant messaging (IM) application (app), and a communication (e.g., phone) application.

In general, network 120 can be any combination of connections and protocols that will support communications among computing device 110. Network 120 can include, for example, a local area network (LAN), a wide area network (WAN), such as the Internet, a cellular network, or any combination of the preceding, and can further include wired, wireless, and/or fiber optic connections.

In one embodiment, graphical user interface 130 operates on computing device 110. In another embodiment, graphical user interface 130 operates on another computer in a server based setting, for example on a server computer. In yet another embodiment, graphical user interface 130 operates on computing device 110 simultaneously with a server computer interconnected through network 120. Graphical user interface 130 may be any user interface used to access information from computing device 110, such as information gathered or produced by cognitive scrollbar program 200. Additionally, graphical user interface 130 may be any user interface used to supply information to computing device 110, such as information supplied by a user to be used by cognitive scrollbar program 200. In some embodiments, graphical user interface 130 may present a generic web browser used to retrieve, present, and negotiate resources from the Internet. In other embodiments, graphical user interface 130 may be a software or application that enables a user at computing device 110 access to network 120.

In yet another embodiment, a user of computing device 110 can interact with graphical user interface 130 through a touch screen that performs as both an input device to a graphical user interface (GUI) and as an output device (i.e., an electronic display) presenting a plurality of icons associated with software applications or images depicting the executing software application. Optionally, a software application (e.g., a web browser) can generate graphical user interface 130 operating within the GUI of computing device 110. Graphical user interface 130 accepts input from a plurality of input/output (I/O) devices including, but not limited to, a tactile sensor interface (e.g., a touch screen or a touchpad) referred to as a multi-touch display. An I/O device interfacing with graphical user interface 130 may be connected to computing device 110, which may operate utilizing wired (e.g., USB port) or wireless network communications (e.g., infrared, NFC, etc.). Computing device 110 may include components, as depicted and described in further detail with respect to FIG. 4, in accordance with embodiments of the present invention.

In one embodiment, cognitive scrollbar program 200 operates on computing device 110. In another embodiment, cognitive scrollbar program 200 operates on another computer in a server based setting, for example on a server computer. In yet another embodiment, cognitive scrollbar program 200 operates on computing device 110 simultaneously with a server computer interconnected through network 120. Cognitive scrollbar program 200 provides the capability to allow the user to interface with a browser page without a plurality of inner and outer scrollbars in the same direction. Cognitive scrollbar program 200 reads the web browser as a function of content web browser 150 is presenting in four areas. Cognitive scrollbar program 200 assesses information from, but not limited to, the four regions: Banner, Dock, Status, and Main working area. In one embodiment, cognitive scrollbar program 200 can resize the application or web browser window. In another embodiment, cognitive scrollbar program 200 can also enhance the viewing area of the presented webpage to calculate whether the scrollbar can dynamically switch between the inner and outer container in the same webpage.

In an example embodiment, cognitive scrollbar program 200 operates as a code snippet within one or more applications on computing device 110. Code snippets define the scope of interactivity between the snippets and the application, (e.g. cognitive scrollbar program 200 hosted by a web browser application). For example, cognitive scrollbar program 200 is a function within web browser 150, and the processes of cognitive scrollbar program 200 occur automatically (i.e., without user intervention) during operation of web browser 150. The dynamic code snippet elements provide scripting support. The variables enable dialog between cognitive scrollbar program 200 and graphical user interface 130.

In one embodiment, cognitive scrollbar program 200 has the ability to analyze the inline contents, remaining spaces, and the enhancement of the viewing area of the web browser on a webpage accessed by a user to determine how to adapt the contents of the webpage such that one scrollbar is used to view the page. In this embodiment, cognitive scrollbar program 200 can analyze and calculate the contents on a webpage to determine that the spaces on the page are large enough to contain all of the inline contents so that no scrollbar is present anywhere on the page and the height of the inner container adapts to the inline contents.

In another embodiment, cognitive scrollbar program 200 has the ability to stretch the inner container of the webpage based on the inline contents of the page. In this embodiment, the scrollbar only displays in the outer container because cognitive scrollbar program 200 determines that the viewing area of the browser or the browser window is too small.

Web browser 150 may be a generic web browser used to retrieve, present, and traverse information resources from the Internet. In some embodiments, web browser 150 may be a web browser designed for a mobile device. In other embodiments, web browser 150 may be a web browser designed for a traditional computing device, such as a desktop computer, PC, or laptop. In general, web browser 150 may be any application or software that enables a user of computing device 110 to access a webpage over network 120. In the depicted environment, web browser 150 resides on computing device 110. In other embodiments, web browser 150, or similar web browsers, may reside on other computing devices capable of accessing a webpage over network 120.

Figure 2:
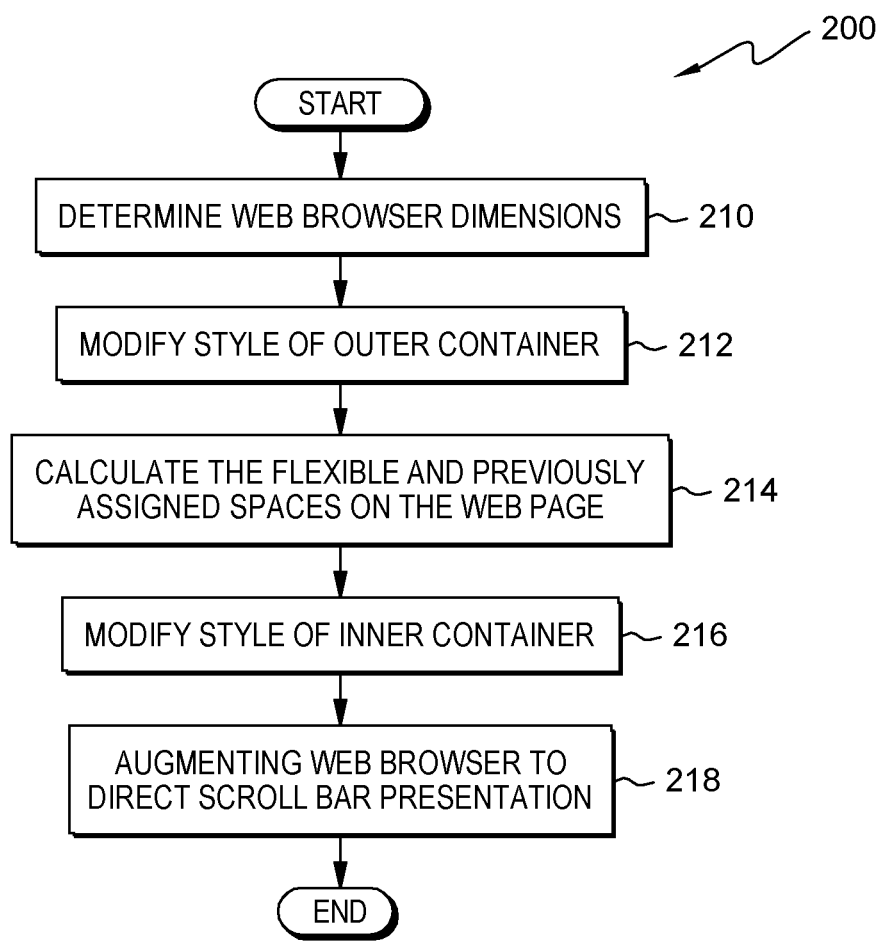
FIG. 2 is a flowchart depicting operational steps of a cognitive scrollbar program for adapting a webpage presentation to the inline contents of the webpage and automatically resolving the screen based on user preferences, in accordance with an embodiment of the present invention.

FIG. 2 is a flowchart depicting operational steps of cognitive scrollbar program 200, a program for adapting a webpage presentation to the inline contents of the webpage and automatically resolving the screen based on user preferences, in accordance with an embodiment of the present invention.

Cognitive scrollbar program 200 determines web browser dimensions (210). In one embodiment, cognitive scrollbar program 200 reads information associated with web browser 150 as a function of information that web browser 150 is presenting in the display area of web browser 150. For example, the information associated with web browser 150 includes data from hypertext markup language, hypertext transfer protocol, and software applications. Cognitive scrollbar program 200 determines the information that web browser 150 is presenting by dividing the page into the four regions. The inner container is contained within the main working area. In an example, a main working area is flexible. A flexible inner container is automatically sized because the main working area contains a dynamic sub container element. Cognitive scrollbar program 200 automatically assesses the available space on the rest of the page based upon an assessment of the main working area. In other embodiments, the main working area may contain tree tables, a grid, or another sub container that has different page elements. In this example, the main working area is flexible, and the banner, dock, and status areas of web browser 150 collectively comprise the outer container, which are fixed in size. In another embodiment, cognitive scrollbar program 200 determines web browser 150 dimensions of a page based upon a fixed height of the form table components and data grid. In yet another embodiment, the outer container dimension is assigned a value based upon a height dimension of web browser 150. In this example, cognitive scrollbar program 200 determines that web browser 150 height dimensions, and the fixed height of the form table components on the page, are large enough to contain all of the inline contents so that no scrollbar will show anywhere on the page and the height of the inner container will adapt to the inline contents.

Cognitive scrollbar program 200 modifies the outer container (212). In this embodiment, cognitive scrollbar program 200 automatically orients the dimensions of the outer container based on the assessment from the previous step. Cognitive scrollbar program 200 performs this step as a function of the assessment of the value assigned to the remaining available space on web browser 150 excluding the outer container. Cognitive scrollbar program 200 derives the value from the information, or data, on web browser 150 based upon the initial assessment of the hypertext transfer protocol (HTTP). The HTTP defines how information is formatted, transmitted, and what actions web servers and browsers should take in response to various commands. Cognitive scrollbar program 200 determines the orientation and modification of the outer container based on the data from the HTTP. The outer container assessment is to be understood as a fixed value once cognitive scrollbar program 200 assigns the outer container parameters. The parameters of the outer container are assigned based on the overflow attributes of web browser 150 data used by cognitive scrollbar program 200 to assess and modify the outer container. In an example, cognitive scrollbar program 200 modifies the outer container such that all the data available from web browser 150 can be presented on web browser 150. In another embodiment, cognitive scrollbar program 200 modifies the outer container to a minimum value as a function of the data presented on web browser 150. In this example, cognitive program 200 orients the outer container of web browser 150 as a function of data on web browser 150 that presents a jpeg file. The jpeg file does not stretch the outer container beyond a minimal height setting.

Cognitive scrollbar program 200 calculates the flexible and remaining spaces of the inner container (214). In one embodiment, cognitive scrollbar program 200 assesses how the dimensions of the inner container can be modified without any outflow of data beyond the spaces in the inner container. In an example, cognitive scrollbar program 200 calculates the flexible height of the inner container as a function of the height value of web browser 150 and the fixed height components. In another embodiment, cognitive scrollbar program 200 calculates the maximum height of the inner container and assigns a value based upon the calculation. Based upon the calculated value, cognitive scrollbar program 200 determines that web browser 150 has a margin space at the bottom of the page. In this example, cognitive scrollbar program 200 utilizes the previously assessed information in the outer container to determine that the inline contents of the inner container are minimal. Cognitive scrollbar program 200 creates a margin at the bottom of the browser such that web browser 150 includes a space between the outer container and the inner container.

Cognitive scrollbar program 200 modifies the inner container (216). Cognitive scrollbar program 200 compares the maximum value of the inner container with the pre-set value of the browser page. The value difference, between the maximum value of the inner container and the pre-set value assigned to web browser 150, is the minimum height value that cognitive scrollbar program 200 accepts to show the contents of the webpage to a user. In an embodiment, cognitive scrollbar program 200 assigns the inner container value as the minimum value possible. In this example, cognitive scrollbar program 200 determines that the value of the inner container is less than the pre-set value of web browser 150. Cognitive scrollbar program 200 orients the inner container such that information is contained in the inner spaces. In another embodiment, cognitive scrollbar program 200 assigns the inner container a value that is greater than the pre-set value assigned to the web browser 150. In this example, cognitive scrollbar program 200 determines that the inner container must equal the size of the outer container. Cognitive scrollbar program 200 stretches the inner container allowing the inner container occupy as much of the page on web browser 150 that the outer container permits. In this embodiment, web browser 150 does not depict a delineation between the inner and outer container.

Cognitive scrollbar program 200 augments web browser 150 to direct presentation of scrollbar (218). In one embodiment, cognitive scrollbar program 200 directs the sizing of the flexible and remaining spaces on web browser 150 to generate space for the scrollbar. Cognitive scrollbar program 200 presents the user with a scrollbar and places the scrollbar in the outer container. In this example, the inner container contains all of the data from web browser 150 without expanding to accommodate the data. Cognitive scrollbar program 200 presents the user with the scrollbar in the outer container to accommodate the size of the data presented in the other areas, excluding the outer container, of web browser 150.

Figure 3A:
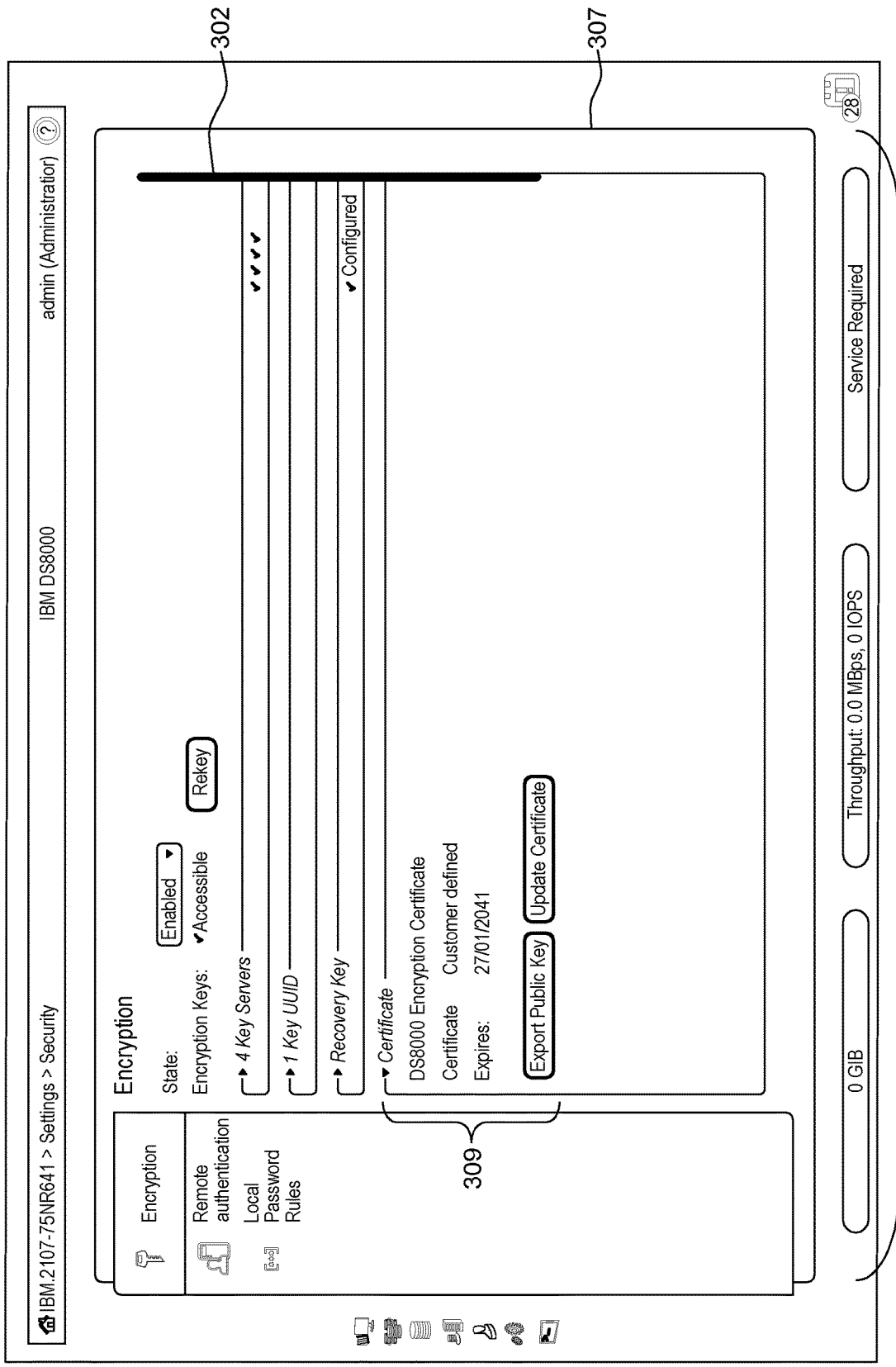
FIG. 3a illustrates an example of cognitive scrollbar program automatically adapting the webpage to the inline contents and automatically resolving the screen, in accordance with an embodiment of the present invention.

FIG. 3a illustrates an example of cognitive scrollbar program automatically adapting the webpage to the inline contents and automatically resolving the screen, in accordance with an embodiment of the present invention.

In this example, cognitive scrollbar program 200 operates on web browser 305 with the viewing area of the browser enhanced to 110%, with scrollbar 302 presented in outer container 307. As in step 210 of FIG. 2, cognitive scrollbar program 200 determines that the web browser 305 viewing area is enhanced to 110%. Cognitive scrollbar program 200 analyzes the form table, as in step 212 of FIG. 2. As in step 214 of FIG. 2, cognitive scrollbar program 200 calculates the spaces on the web page. Cognitive scrollbar program 200 assesses how the dimensions of inner container 309 can be modified without any outflow of data beyond the spaces of inner container 309. Cognitive scrollbar program 200 analyzes the form table and determines that a group of different field sets are being used to display a key server, a key label, the recovery keys, and the certificates separately. In this example, as depicted in step 216 of FIG. 2, cognitive scrollbar program 200 modifies the style of the inner container. Cognitive scrollbar program 200 compares the maximum value of inner container 309 with the pre-set value of web browser 305. Cognitive scrollbar program 200 determines that one field set can be expanded on web browser 305, while presenting information in the inner container 309 at an enhancement of 110%, at a time. Cognitive scrollbar program 200, as in step 218 of FIG. 2, augments the web browser to direct presentation of the scrollbar to the user in the outer container 307, on the right side of the page.

In another embodiment, cognitive scrollbar program 200 augments web browser 305 to direct the scrollbar to inner container 309. Cognitive scrollbar program 200 presents the user with a scrollbar and places the scrollbar in inner container 309. In this example, the viewing area of the browser is minimal and this causes the inline contents to overflow and stretch the inner container. Cognitive scrollbar program 200 will present the user with the scrollbar in the inner container 309 so that the user can utilize the remaining spaces to show as much of web browser 305 content as possible. The user is able to compare the contents of the inner container 309 with the contents of other areas of web browser 305.

Figure 3B:
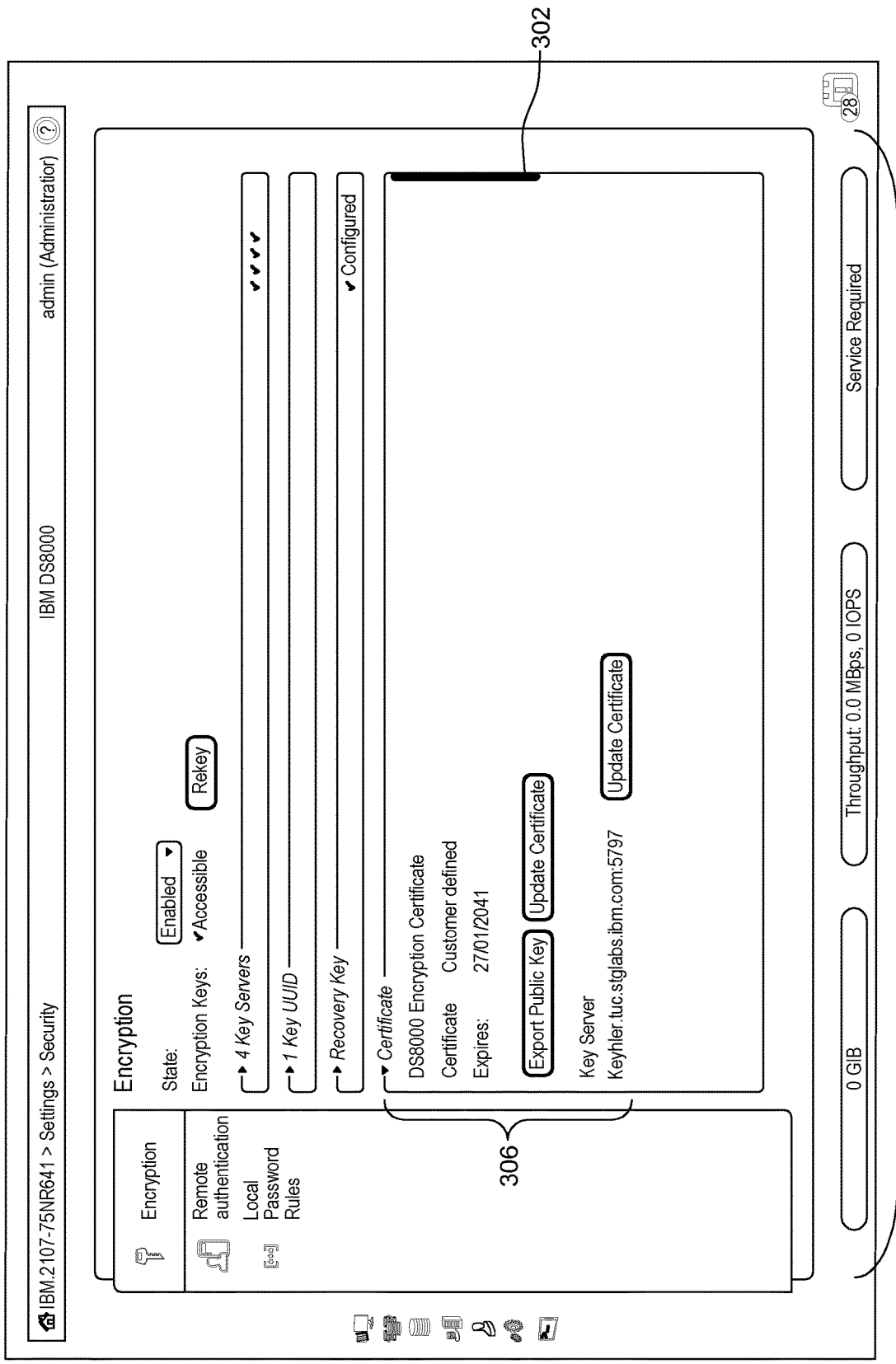
FIG. 3b illustrates an example of cognitive scrollbar program presenting a user with a scrollbar in the inner container, in accordance with an embodiment of the present invention.

FIG. 3b illustrates an example of cognitive scrollbar program presenting a user with a scrollbar in the inner container, in accordance with an embodiment of the present invention.

In this example, cognitive scrollbar program 200 operates on web browser 304 with the viewing area of the browser enhanced to 100%, with scrollbar 302 present in the inner container 306. As depicted in step 210 of FIG. 2, cognitive scrollbar program 200 analyzes the web browser and determines the web browser is enhanced to 100%. Cognitive scrollbar program 200 analyzes the form table, as in step 212 of FIG. 2, modifying the style of the outer container, and determines, as in step 214, calculates the previously assessed spaces on the web page, that a group of different field sets are being used to display a key server, a key label, the recovery keys, and the certificates separately. In this example, cognitive scrollbar program 200 determines that more information can be presented, multiple field sets can be expanded, and the information can be scrolled through in the inner container 306. As in step 216 of FIG. 2, cognitive scrollbar program 200 modifies the style of the inner container. In this example, cognitive scrollbar program 200, as in step 218 of FIG. 2, augments the web browser to direct scrollbar presentation. Cognitive scrollbar program 200 places the scroll bar in the inner container 306 to scroll up and down to view the inline contents at an enhancement of 100%.

Figure 3C:
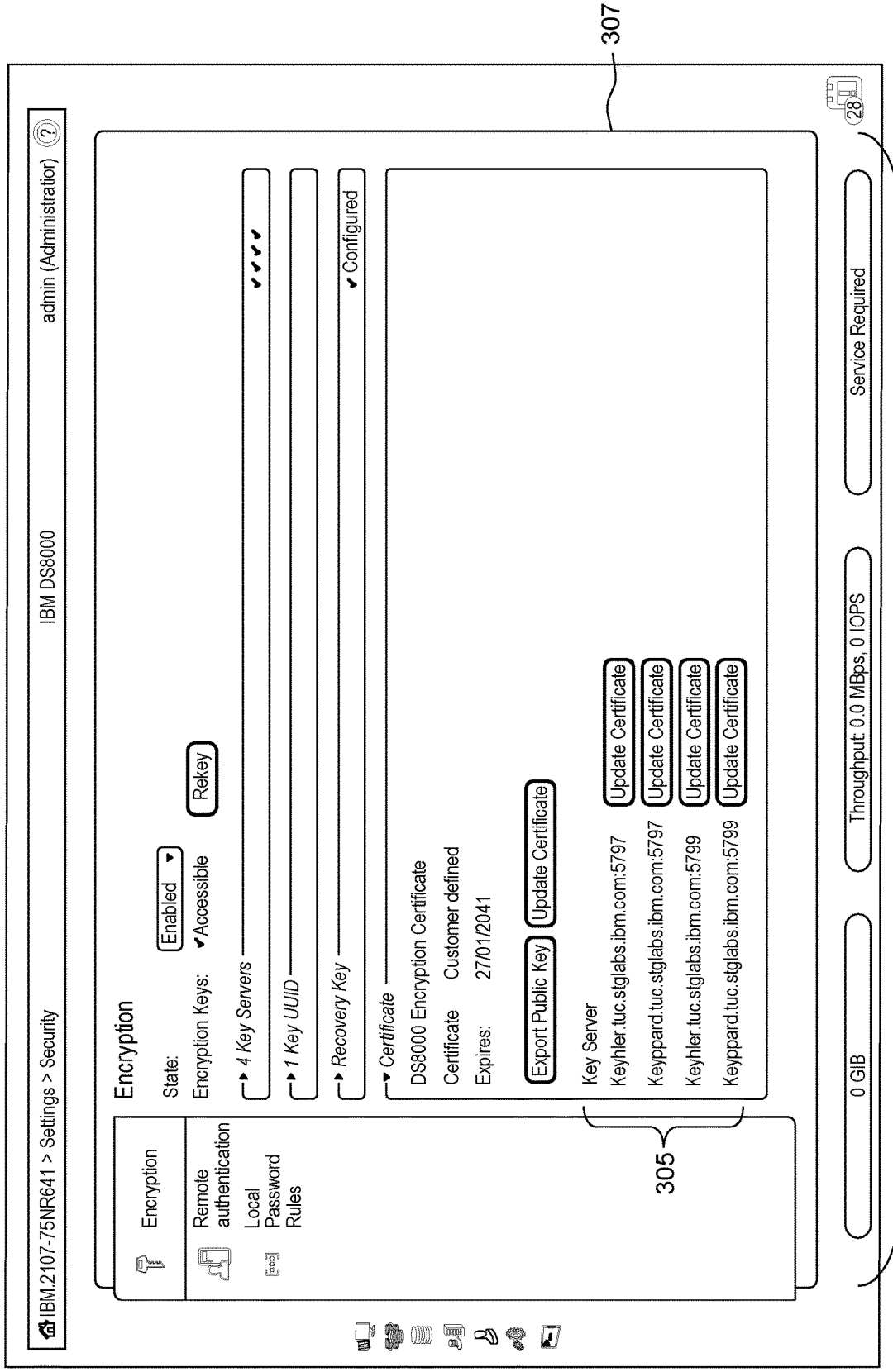
FIG. 3c illustrates an example of cognitive scrollbar program presenting a user with a scrollbar in the outer container, in accordance with an embodiment of the present invention.

FIG. 3c illustrates an example of cognitive scrollbar program without presenting a user with a scrollbar, in accordance with an embodiment of the present invention.

In this example, cognitive scrollbar program 200 operates without a scrollbar present on web browser 303 at an enhancement of 90%, and an inner container 305. As in step 210 of FIG. 2, cognitive scrollbar program 200 determines that the web browser is enhanced to 90%. As in step 214 of FIG. 2, cognitive scrollbar program 200 calculates the spaces on the web page. Cognitive scrollbar program 200 analyzes the form table and determines that a group of different field sets are being used to display a key server, a key label, the recovery keys, and the certificates separately. In this example, cognitive scrollbar program 200 analyzes an encryption panel on web browser 303 enhanced to 90% and determines that the multiple contents of web browser 303 can be viewed in inner container 305 without a scrollbar on web browser 303 at an enhancement of 90%.

In yet another embodiment, as in step 218 of FIG. 2, cognitive scrollbar program 200 augments web browser 150 directing the page to present without requiring a scrollbar. Cognitive scrollbar program 200 directs the sizing of the flexible and remaining spaces on web browser 303 to render a scrollbar unnecessary. Cognitive scrollbar program 200 does not present the user with a scrollbar. In this example, cognitive scrollbar program 200 determined that the user can navigate web browser 150 without a scrollbar. Cognitive scrollbar program 200 determined that the inline contents on web browser 150 are able to contain all of the data presented without a scrollbar.

Figure 4:
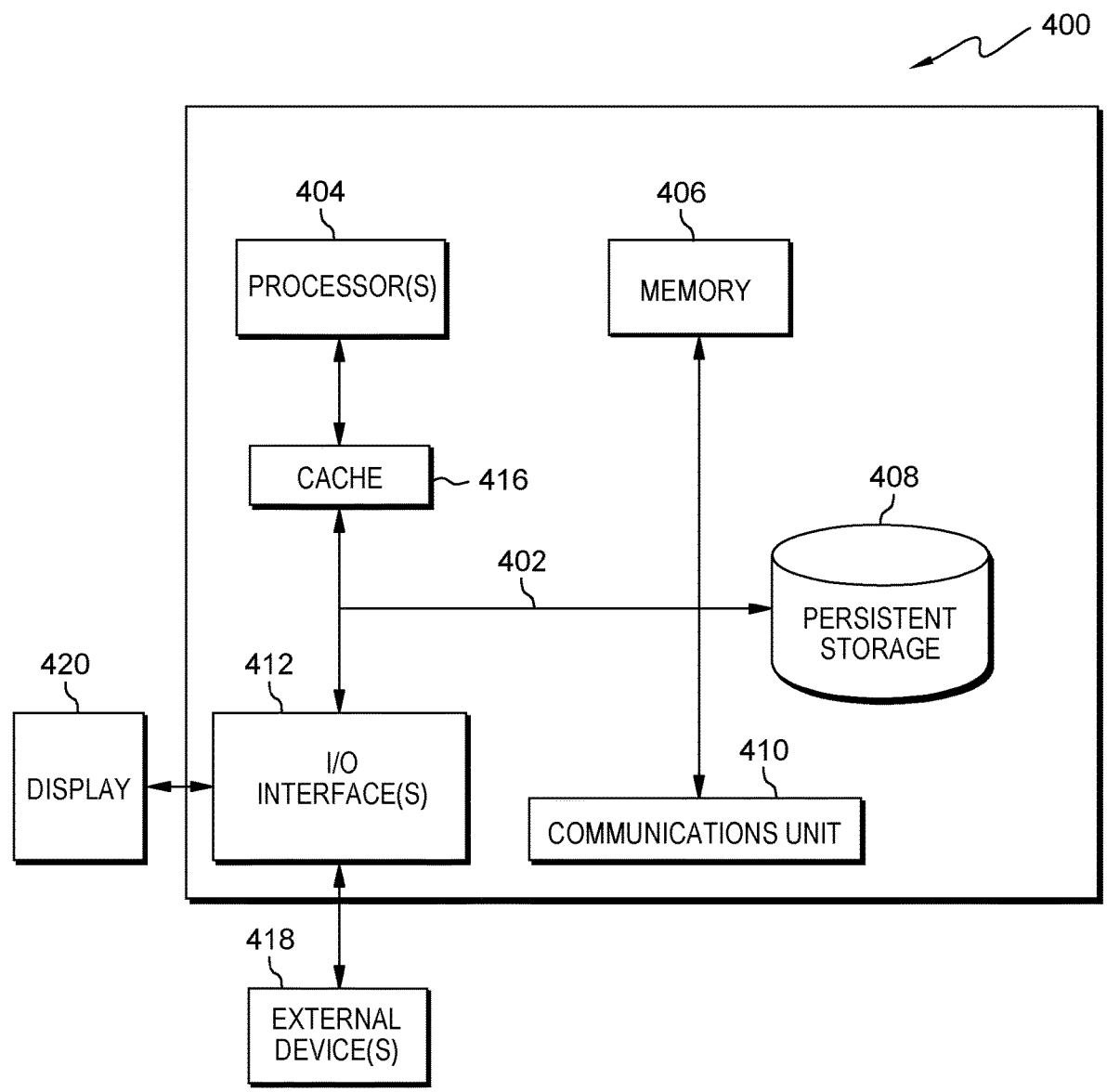
FIG. 4 is a block diagram of components of a computer system, such as the server computer of FIG. 1, in an embodiment, in accordance with the present invention.

FIG. 4 depicts computer system 400, where computer system 400 represents a computer system in distributed data processing environment 100. Computing device 110 represents an example of a computer system in distributed data processing environment 100, where computing device 110 includes cognitive scrollbar program 200. Computer system 400 includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for calculating a space on a web browser for a scrollbar, the method comprising:
   determining, by one or more processors, dimensions of a web browser presenting a webpage, the webpage including an inner container and an outer container;
   modifying, by one or more processors, dimensions of the outer container of the webpage based upon an associated maximum height value, an associated minimum height value, and an amount of data within the outer container;
   responsive to calculating a vertical height of the inner container, assigning, by one or more processors, a maximum height value and a minimum height value to the inner container;
   modifying, by one or more processors, dimensions of the inner container to a minimum height for the web browser to present the data of the webpage, based on the assigned maximum height value and minimum height value of the inner container; and
   augmenting, by one or more processors, the web browser to include a scrollbar based on the modified dimensions of the outer container and the modified dimensions of the inner container.

2. The method of claim 1, wherein modifying dimensions of the outer container further comprises:
   responsive to determining that the maximum height value for the outer container meets a value threshold for displaying the content of the webpage that is within the outer container, augmenting, by one or more processors, the outer container to display all the content of the webpage that is within the outer container without including a scrollbar in the outer container.

3. The method of claim 1, wherein modifying dimensions of the outer container further comprise:
   determining, by one or more processors, an overflow attribute associated with the outer container, the overflow attribute indicating whether webpage content within the outer container exceeds an available display area of the outer container.

4. The method of claim 1, wherein the scrollbar is displayed in one of: (i) the outer container and (ii) the inner container.

5. A computer program product comprising:
   one or more computer readable tangible storage media and program instructions stored on at least one of the one or more storage media, the program instructions comprising:
   program instructions to determine dimensions of a web browser presenting a webpage, the webpage including an inner container and an outer container;
   program instructions to, modify dimensions of the outer container of the webpage based upon an associated maximum height value, an associated minimum height value, and an amount of data within the outer container;
   program instructions to, responsive to calculating a vertical height of the inner container, assign a maximum height value and a minimum height value to the inner container;
   program instructions to modify dimensions of the inner container to a minimum height for the web browser to present the data of the webpage, based on the assigned maximum height value and minimum height value of the inner container; and
   program instructions to augment the web browser to include a scrollbar based on the modified dimensions of the outer container and the modified dimensions of the inner container.

6. The computer program product of claim 5, wherein modifying dimensions of the inner container further comprising program instructions, stored on the one or more computer readable storage media, which when executed by a processor, cause the processor to:
   identify content of the webpage in the inner container; and
   augment the content of the webpage in the inner container to include a space to present the scrollbar.

7. The computer program product of claim 5, wherein modifying dimensions of the outer container further comprises:
   responsive to determining that the maximum height value for the outer container meets a value threshold for displaying the content of the webpage that is within the outer container, augmenting the outer container to display all the content of the webpage that is within the outer container without including a scrollbar in the outer container.

8. The computer program product of claim 5, further comprising program instructions, stored on the one or more computer readable storage media, which when executed by a processor, cause the processor to:
   identify a main working area within the inner container, wherein the main working area includes a data structure, and wherein the main working area is flexible, allowing modifications to the dimensions of main working area; and
   determine available space in the main working area of the inner container.

9. The computer program product of claim 5, wherein modifying dimensions of the outer container further comprise:
   determining an overflow attribute associated with the outer container, the overflow attribute indicating whether webpage content within the outer container exceeds an available display area of the outer container.

10. The computer program product of claim 5, wherein the scrollbar is displayed in one of: (i) the outer container and (ii) the inner container.

11. The computer system of claim 5, wherein modifying dimensions of the inner container further comprising program instructions, stored on the one or more computer readable storage media, which when executed by a processor, cause the processor to:
    identify content of the webpage in the inner container; and
    augment the content of the webpage in the inner container to include a space to present the scrollbar.

12. The computer system of claim 5, wherein modifying dimensions of the outer container further comprises:
    responsive to determining that the maximum height value for the outer container meets a value threshold for displaying the content of the webpage that is within the outer container, augmenting the outer container to display all the content of the webpage that is within the outer container without including a scrollbar in the outer container.

13. The computer system of claim 5, further comprising program instructions, stored on the one or more computer readable storage media, which when executed by a processor, cause the processor to:
- identify a main working area within the inner container, wherein the main working area includes a data structure, and wherein the main working area is flexible, allowing modifications to the dimensions of main working area; and
- determine available space in the main working area of the inner container.

14. The computer system of claim 5, wherein modifying dimensions of the outer container further comprise:
- determining an overflow attribute associated with the outer container, the overflow attribute indicating whether webpage content within the outer container exceeds an available display area of the outer container.

15. A computer system comprising:
- one or more computer processors;
- one or more computer readable storage media; and
- program instructions stored on the computer readable storage media for execution by at least one of the one or more computer processors, the program instructions comprising:
- program instructions to determine dimensions of a web browser presenting a webpage, the webpage including an inner container and an outer container;
- program instructions to, modify dimensions of the outer container of the webpage based upon an associated maximum height value, an associated minimum height value, and an amount of data within the outer container;
- program instructions to, responsive to calculating a vertical height of the inner container, assign a maximum height value and a minimum height value to the inner container;
- program instructions to modify dimensions of the inner container to a minimum height for the web browser to present the data of the webpage, based on the assigned maximum height value and minimum height value of the inner container; and
- program instructions to augment the web browser to include a scrollbar based on the modified dimensions of the outer container and the modified dimensions of the inner container.

* * * * *